Aug. 25, 1925. 1,551,088
M. COLLIS
BISCUIT IMPRINTING MACHINE
Filed June 10, 1924 3 Sheets-Sheet 1

WITNESSES
INVENTOR
Meyer Collis,
BY
ATTORNEYS

Aug. 25, 1925.                    M. COLLIS                    1,551,088
                        BISCUIT IMPRINTING MACHINE
                    Filed June 10, 1924         3 Sheets-Sheet 2
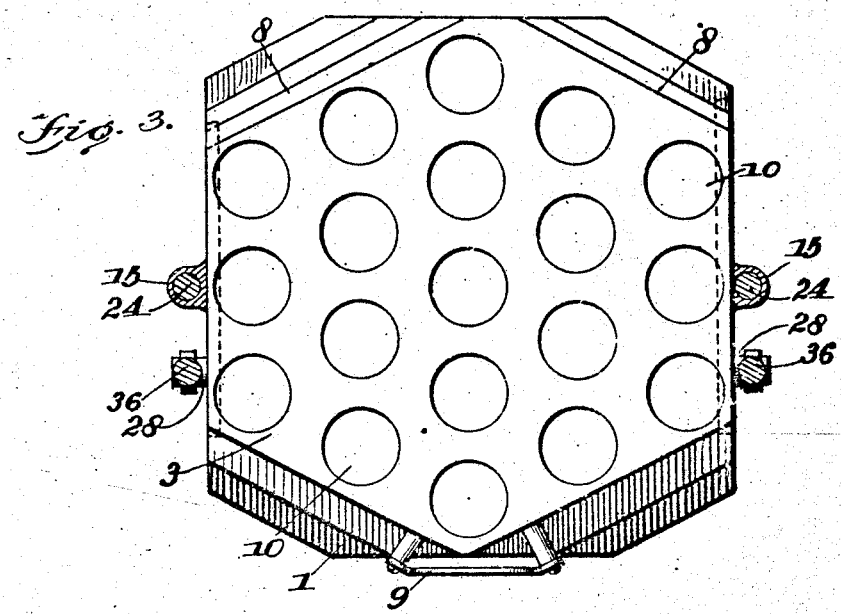
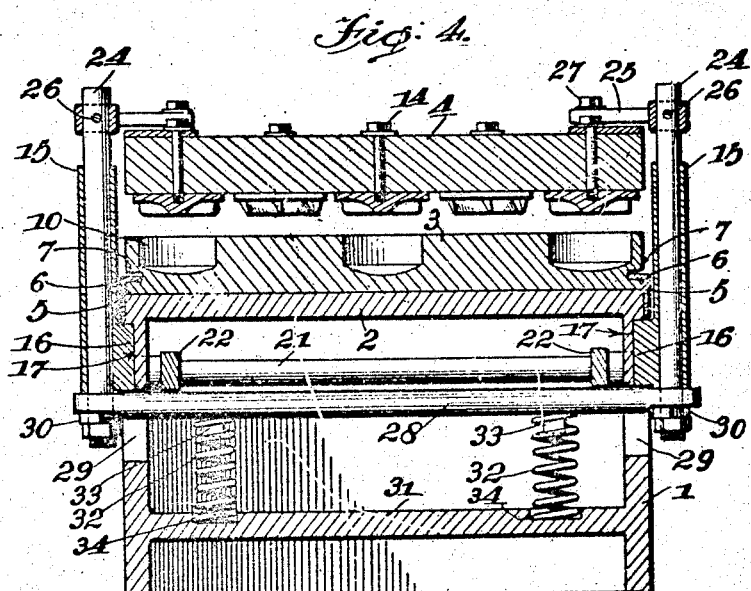

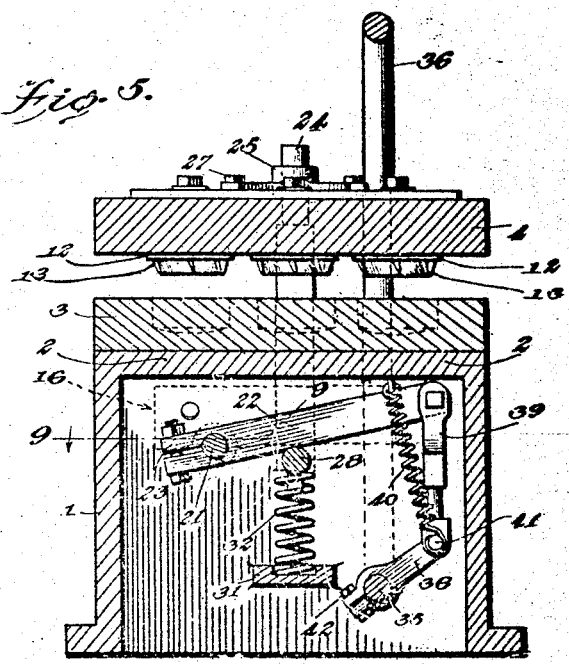

Patented Aug. 25, 1925.

1,551,088

UNITED STATES PATENT OFFICE.

MEYER COLLIS, OF CHARLESTON, SOUTH CAROLINA.

BISCUIT-IMPRINTING MACHINE.

Application filed June 10, 1924. Serial No. 719,164.

*To all whom it may concern:*

Be it known that I, MEYER COLLIS, a subject of Russia (who has taken out his first papers), and a resident of Charleston, in the county of Charleston and State of South Carolina, have invented certain new and useful Improvements in Biscuit-Imprinting Machines, of which the following is a specification.

This invention relates to improvements in machines for making imprints on biscuits, so-called rolls and the like, and it consists of the constructions, combinations and arrangements herein described and claimed.

An object of the invention is to provide a machine by the use of which a considerable number of biscuits or rolls may be imprinted with a certain adopted design at one time, not only insuring a uniformity in design but also expediting the work.

Another object of the invention is to provide a tray having a plurality of pockets into each of which the biscuit or roll dough is placed, said tray then being slid in place upon the base of the machine whereupon the presser head which carries the dies is lowered so that the desired imprint is made in the dough.

Other objects and advantages appear in the following specification, reference being had to the accompanying drawings, in which—

Figure 3 is a horizontal section on the line 3—3 of Figure 1.

Figure 4 is a vertical longitudinal section on the line 4—4 of Figure 2.

Figure 5 is a vertical cross section on the line 5—5 of Figure 2.

Figure 6 is a detail cross section taken substantially on the line 6—6 of Figure 2, and showing how the dies enter the dough pockets to make an imprint.

Figure 7 is a detail plan view of one of the dies.

Figure 8 is a detail inverted perspective view of one of the dies.

Figure 9 is a detail cross section on the line 9—9 of Figure 5, and illustrating a bearing subsequently referred to.

In carrying out the invention provision is made of a base 1 which is hollow as shown in Figures 4 and 5 and is provided with a top 2. The top provides a support upon which the tray 3 rests when in the position for imprinting the biscuits or so-called rolls.

Figure 2:
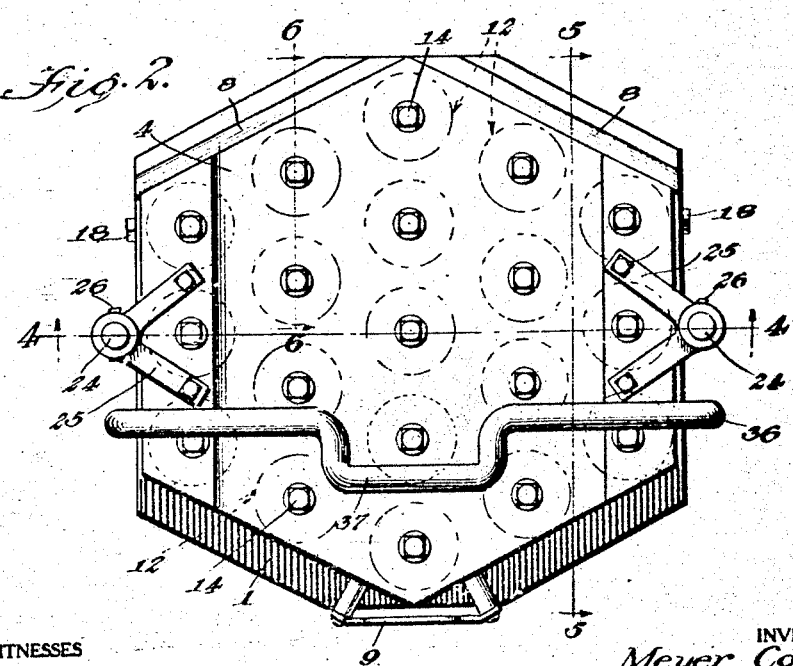
Figure 2 is a plan view.

For the purpose of insuring the proper positioning of the tray 3 in respect to the presser head 4 the base 1 carries a pair of guides 5 with bent flanges 6 which enter grooves 7 at the sides of the tray. The base 1 also carries a pair of cleats 8 (Fig. 2) which extend across the top 2 and limit the movement of the tray when slid upon the guides. The tray carries a handle 9 by means of which it may readily be moved back and forth. It is to be observed that the tray is of a regular polygonal shape. This shape has been adopted in this particular instance to accommodate 19 dough pockets 10, it having been found that the particular number of pockets involved and the particular shape of the tray 3 work out properly. It should be understood, however, that in practice the shape of the tray 3 as well as the number of pockets 10 employed may be varied as may be found necessary or desirable. More or less pockets may be used without affecting the invention.

It is the purpose of the machine to imprint a design upon small masses of dough placed in each of the pockets 10. The die 11 (Figs. 7 and 8) used in this particular instance produces a peculiar crossed crease, identifying the finished product with what is commonly known as a Vienna roll and sometimes called a Kaiser roll. Each of the dies 11 is precisely alike and the description of one will answer for all.

The die 11 is composed of a circular plate 12 which carries a plurality of blades 13. The peripheral edges of the blades fall short of the periphery of the plate 12 thereby leaving a clear flange which is adapted to seat upon the top of the tray 3 when the head 4 is in the imprinting position (Fig. 6) and thereby prevent any dough from squeezing out of the dough pockets. It is to be observed that the blades 13 are crossed, and are curved in opposite directions. They also stand at a slight inclination to the plates 12 and thereby produce a die which is peculiarly adapted to the particular purpose in mind.

A bolt 14 holds the die in place. This bolt is screwed through the head 4 and into the die. The arrangement is clearly shown in Figure 4. It should be pointed out that in practice the dies 11 may be made integral with the presser head 4, that is to say both parts may be cast in one. However, it is anticipated that the particular construction shown has the advantage of permitting the replacement of any one of the dies should a breakage occur. This could not be readily done if all of the dies were cast integrally with the presser head.

Situated at the sides of the base 1 are guide tubes 15. Each of these is mounted upon a plate 16 which is mounted in a recess 17 in the base 1, where they are held in place by bolts 18. Each of the plates includes a bearing 19 (Fig. 9) which enters the hollow base 1 through a suitable opening 20. The bearings 19 are for the purpose of supporting a rod 21 by which a pair of cranks 22 are carried.

The cranks are clamped in place as at 23 (Fig. 5).

Movable in the guide tubes 15 are carrier rods 24 which support and carry the presser head 4 by means of brackets 25. These brackets are pinned at 26 or otherwise suitably secured to the rod 24. The brackets extend over the presser head 4 (Fig. 2) to which they are suitably secured by means of bolts 27. Extending from one to the other of the carrier rods 24 at the bottom (Fig. 4) is a span rod 28. This rod operates in slots 29 in the sides of the base 1. It is rigidly secured to the rods 24 by any suitable means, nuts 30 being shown to illustrate a conventional fastening.

A rest 31 extending across the base 1 supports a pair of springs 32 which press upward on the rod 28 and thus keep the presser head 4 in a normally raised position. The span rod 28 may be provided with lugs 33 so that the springs may not slip off. Similarly, the rest 31 may be provided with recesses 34 to be occupied by the springs.

Figure 1:
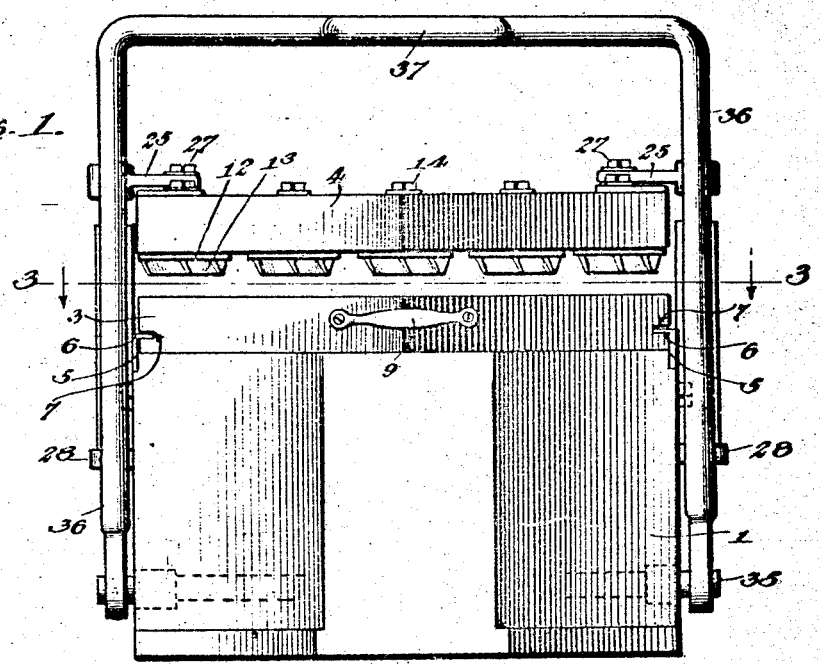
Figure 1 is a front elevation of the improved imprinting machine.

Journaled upon the base 1 somewhat in advance of the span rod 28 and the rest 31 is a lever rod 35 which carries a yoke or handle 36 (Fig. 1) by means of which the machine is operated. The yoke has a centrally bent portion 37 (Fig. 2) which more properly forms a handle intended to be grasped by the operator in pulling the yoke forward. The rod 35 carries a pair of levers 38 (Fig. 5) of which only one is shown in the drawings. Each of the levers 38 is connected with a corresponding crank 22 by means of a link 39. The links are made in two parts, one being screwed within the other. Upon desiring to adjust the links for length one of the pivotal bolts may be removed and replaced after the desired adjustment has been made. Springs 40 attached beneath the top 2 and to a rod 41 which reaches from one lever to the other pulls up on the levers and returns the yoke 36 to a normally erect position. Although the springs 32 will aid in returning the yoke 36 to the upright position by virtue of pressing upward on the span rod 28 and the cranks 22, yet they are not relied upon to perform this function. It is to be observed that the levers 38 are clamped upon the rod 35 at 42 in a manner similar to the mounting of the cranks 22.

The operation may be readily understood from the following additional description. Each of the pockets 10 of the tray 3 is filled with a predetermined amount of dough, and when each of the pockets is filled the tray is slid in place upon the flanges 6 of the guides 5 on top of the top 2. The cleats 8 (Fig. 2) limit the movement of the tray. The parts are so made that the pockets 10 will come exactly beneath the dies 11.

The movement of the presser head 4 is perfectly rectilinear, this being insured by the rigid tubular guides 15 and the carrier rods 24 which slide therein. Proper registration of the dies 11 with the dough pockets 10 make this kind of movement necessary.

Upon pulling forward on the yoke 36 the lever rod 35 will correspondingly rock forward, pulling down on the links 39 so that the cranks 22 (Fig. 5) press down upon the span rod 28 and pull down on the carrier rod 24 producing the rectilinear movement of the head 4 previously spoken of. The blades 13 of the dies then enter the pockets 10. The flanges 12 of the dies contact the top of the tray 3 (Fig. 6) thereby serving to close the dough pockets and prevent any dough from squeezing out.

Upon releasing the yoke 36 the combined influence of the springs 32 and 40 will cause the yoke, presser head and associated parts to return to the original position, whereupon the tray 3 can be removed from the machine by pulling on the handle 9. The imprinted dough blanks are then removed, the pockets 10 are refilled and the tray is replaced for a repetition of the foregoing operation.

The use of this machine has numerous advantages. It is to be observed that a considerable number of dough blanks are imprinted at one time. In the present instance, one operation of the machine imprints 19 blanks. This alone, is a decided advance over the prevalent method of imprinting each dough blank separately. The use of the machine also insures absolute uniformity in imprinting each of the blanks. The work of preparing the blanks for baking is greatly facilitated.

While the construction and arrangement of the improved imprinting machine is that of a generally preferred form, obviously modifications and changes may be made without departing from the spirit of the invention or the scope of the claims.

I claim:—

1. A machine of the character described comprising a base, a pair of guide tubes fixed upon the base, a carrier rod slidable in each tube, a presser head carried by the rods, a die carried by the head, a tray adapted to be inserted beneath said head and between the guide tubes upon said base, said tray having a pocket for receiving a plastic mass, means on the base upon which said tray is slidable into position for the registration of said pocket with the die, means for limiting the sliding of the tray thereby indicating the fact of registration, and means for moving the carrier rod within the guide tubes to superimpose the presser head upon the tray.

2. A machine of the character described comprising a base, a pair of guide tubes fixed upon the base, a carrier rod slidable in each tube, a presser head carried by the rods, a die carried by the head, a tray inserted beneath said head and between the guide tubes upon said base, said tray having a pocket for receiving a plastic mass, means upon the base insuring registration of said pocket with the die, means for moving the carrier rod within the guide tubes to superimpose the presser head upon the tray, and means against the tension of which said rods are moved, said means serving to return the presser head to the original position after an imprinting operation.

3. A device of the character described comprising a base, a guide tube affixed to each side of the base, carrier rods slidable in the tubes, a rod spanning said carrier rods at the bottom, said span rod occupying slots in the base and having fixed connection with the carrier rods, a presser head carried by the carrier rods, a die carried by the presser head, a tray having a pocket for receiving a plastic mass, means upon the base in relation to which the tray is so placed as to hold it in position and insure registration of the pocket with the die, and means for bearing down upon the span rod to slide the carrier rods in said guide tubes and superimpose the presser head upon the tray.

4. A device of the character described comprising a base, a guide tube affixed to each side of the base, carrier rods slidable in the tubes, a rod spanning said carrier rods at the bottom, said span rod occupying slots in the base and having fixed connection with the carrier rods, a presser head carried by the carrier rods, a die carried by the presser head, a tray having a pocket for receiving a plastic mass, means upon the base for holding the tray in position to insure registration of the pocket with the die, a crank situated upon the base in contact with the span rod, means for turning the crank to bear down upon the span rod and cause the superimposition of the presser head upon the tray, means including springs against the tension of which the span rod is movable, said springs serving to return the presser head to the original position, and means including springs associated with the cranks against the tension of which said crank is movable but serving to return the crank to the normal position.

5. A device of the character described comprising a base, having a recess and an adjacent slot in each side, a plate fixedly secured in each recess, each plate having an upstanding guide tube, a carrier rod slidable in each tube, a rod spanning the carrier rods extending through the slots and being secured to those portions of the carrier rods exposed beneath the guide tubes, bearings carried by said plates, a rod journaled in said bearing having cranks contacting the span rod, another rod having levers provided with link connections joining the cranks, means including a yoke for rocking the lever rod and thereby sliding both carrier rods in said tubes, a presser head carried by the rods, a die carried by the presser head, a tray having a pocket to receive a plastic mass, and means upon the base for so guiding and limiting the movement of the tray as to insure registration of the pocket with the die when the presser head is superimposed upon the tray.

6. A device of the character described comprising a base having a recess and an adjacent slot in each side, a plate fixedly secured in each recess, each plate having an upstanding guide tube, a carrier rod slidable in each tube, a rod spanning the carrier rods extending through the slots and being secured to those portions of the carrier rods exposed beneath the guide tubes, bearings carried by said plates, a rod journaled in said bearings having cranks contacting the span rod, another rod having levers provided with link connections joining the cranks, means including a yoke for rocking the lever rod and thereby sliding both carrier rods in said tubes, a presser head carried by the rods, a die carried by the presser head, a tray having a pocket to receive a plastic mass, means upon the base for so guiding and limiting the movement of the tray as to insure registration of the pocket with the die when the presser head is superimposed upon the tray, and means including springs associated with both the span rod and levers for respectively returning the presser head and yoke to the original position upon the release of the yoke after an imprinting operation.

7. The combination in a device of the character described comprising a base having a top, a pair of side guides having bent flanges disposed in a plane above the top, a tray having side grooves receiving the flanges when the tray is slid upon the top, and means including cleats mounted on the top for limiting the sliding motion of the tray in one direction.

8. A device of the character described comprising a presser head for supporting a die, a pair of carrier rods pendant from the head in a rigid position, a span rod connecting the free ends of the carrier rods, rigid means in which the carrier rods are slidable, and rockable means including a crank extending across and contacting the span rod for moving the span rod and carrier rods in one direction and thereby depress the head.

9. A machine of the character described comprising a hollow base having a rest, a presser head for supporting a die, guide means mounted upon the base, presser head-carrier means movable in the guide means, connecting means including a span rod traversing the base and protruding therefrom, means by which the span rod is connected to said carrier means, means including springs situated between the rest and span rod normally urging it and the presser head in one direction, means operatively mounted within the base for contacting the opposite side of the span rod, means including a handle situated on the outside of the base for depressing the presser head, and means inside of the base connecting said handle with said contacting means for the operation thereof.

MEYER COLLIS.